(12) United States Patent
Rossi et al.

(10) Patent No.: US 11,194,097 B2
(45) Date of Patent: Dec. 7, 2021

(54) SPLICE ASSEMBLY FOR FIBER OPTIC CABLE

(71) Applicant: COTSWORKS, LLC, Highland Heights, OH (US)

(72) Inventors: Nick Rossi, Cleveland, OH (US); Eugen Artemie, Mayfield Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 0 days.

(21) Appl. No.: 16/882,498

(22) Filed: May 24, 2020

(65) Prior Publication Data
US 2020/0379176 A1 Dec. 3, 2020

Related U.S. Application Data

(60) Provisional application No. 62/853,286, filed on May 28, 2019.

(51) Int. Cl.
*G02B 6/255* (2006.01)

(52) U.S. Cl.
CPC .................. *G02B 6/2555* (2013.01)

(58) Field of Classification Search
CPC .................................................. G02B 6/2555
See application file for complete search history.

(56) References Cited

U.S. PATENT DOCUMENTS

| 4,124,364 | A | * | 11/1978 | Dalgoutte | ............ | G02B 6/2551 |
| | | | | | | 385/73 |
| 5,469,522 | A | | 11/1995 | Fan | | |
| 5,953,474 | A | * | 9/1999 | Basavanhally | ...... | G02B 6/3825 |
| | | | | | | 385/60 |
| 7,918,612 | B1 | | 4/2011 | Zhao | | |
| 10,761,268 | B1 | | 9/2020 | Beranek et al. | | |
| 2009/0034916 | A1 | | 2/2009 | LeBlanc | | |

FOREIGN PATENT DOCUMENTS

WO 2004008211 A1 1/2004

OTHER PUBLICATIONS

Optowares, Permalock Fiber Optic Mechanical Splicing Tool Kit, Revision 060-12, May 24, 2016, 1 page.
(Continued)

*Primary Examiner* — Omar R Rojas
(74) *Attorney, Agent, or Firm* — Tucker Ellis LLP (57) ABSTRACT

A splice assembly for a fiber optic cable that has first and second fiber optic cable sections. The splice includes a filament alignment member configured to align an end portion of a first filament section of the first fiber optic cable section with an opposed end portion of a second filament section of the second fiber optic cable section; a first spring positioned adjacent the first end of the filament alignment member; a second spring positioned adjacent the second end of the filament alignment member; and a housing having a passage in which the first spring, filament alignment member and second spring are longitudinally positioned. The filament alignment member is longitudinally moveable relative to the housing by compression of one of the springs in a direction of travel of the filament alignment member against a corresponding stop feature.

17 Claims, 9 Drawing Sheets

(56) References Cited

OTHER PUBLICATIONS

Performance Specification Sheet, "Splice, Mechanical, Simplex Fiber Optic Cable, Aircraft," MIL-PRF-24623/7A, Jul. 3, 2013, 17 pages.
International Search Report and Written Opinion for corresponding International Application No. PCT/US2020/034435, dated Oct. 19, 2020, 19 pages.

* cited by examiner

SPLICE ASSEMBLY FOR FIBER OPTIC CABLE

RELATED APPLICATION DATA

This application claims the benefit of U.S. Provisional Patent Application No. 62/853,286 filed May 28, 2019, the disclosure of which is incorporated herein by reference in its entirety.

TECHNICAL FIELD OF THE INVENTION

The technology of the present disclosure relates generally to fiber optic cables and, more particularly, to splice assemblies and related methods to repair breaks in fiber optic cables.

BACKGROUND

Military, commercial avionics, and industrial networking equipment manufacturers are adopting fiber optic components for communication applications. An exemplary communication application is to create an operative communication link between a control system and a sensor or other data collection device. Fiber optic links are often used to replace existing electrical (e.g., "copper") wiring architectures because they provide higher speed, improved electromagnetic interference (EMI) performance, lower weight, and increased density. Other advantages of fiber optic links include higher data capacity using multiple wavelengths and running multiple protocols on the same fiber. As a result of these advantages, system upgrades often may be made without replacing the existing fiber optic cable which may run in an area that is difficult to access.

Most fiber optic products are designed for the telecommunications market. But these products are generally not rugged enough to withstand the environmental factors that would adversely affect fiber optic systems in harsh operating environments where extreme states of vibration, shock, and temperature may be present.

Occasionally, fiber optic cables break. To restore operability, the fiber optic cable may be replaced or the fiber optic cable may be spliced. Splicing techniques, however, have been considered temporary fixes in harsh operating environments because the splice itself may introduce a new point of failure. For instance, for a fiber optic cable with a loose jacket (e.g., the cable is made so that the jacket may move relative to a buffer) or with a loose buffer (e.g., the cable is made so that the buffer may move relative to a filament), the splice may result in locally securing the jacket to the buffer and/or securing the buffer to the filament. This creates an undesirable point of stress.

SUMMARY

Disclosed is a splice assembly for use with a plurality of fiber optic cable types that has a first fiber optic cable section and a second fiber optic cable section. The splice includes a filament alignment member configured to align an end portion of a first filament section of the first fiber optic cable section with an opposed end portion of a second filament section of the second fiber optic cable section; a first spring positioned adjacent the first end of the filament alignment member; a second spring positioned adjacent the second end of the filament alignment member; and a housing having a passage in which the first spring, filament alignment member and second spring are longitudinally positioned. The filament alignment member is longitudinally moveable relative to the housing by compression of one of the springs in a direction of travel of the filament alignment member against a corresponding stop feature.

DETAILED DESCRIPTION

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Figure 1:
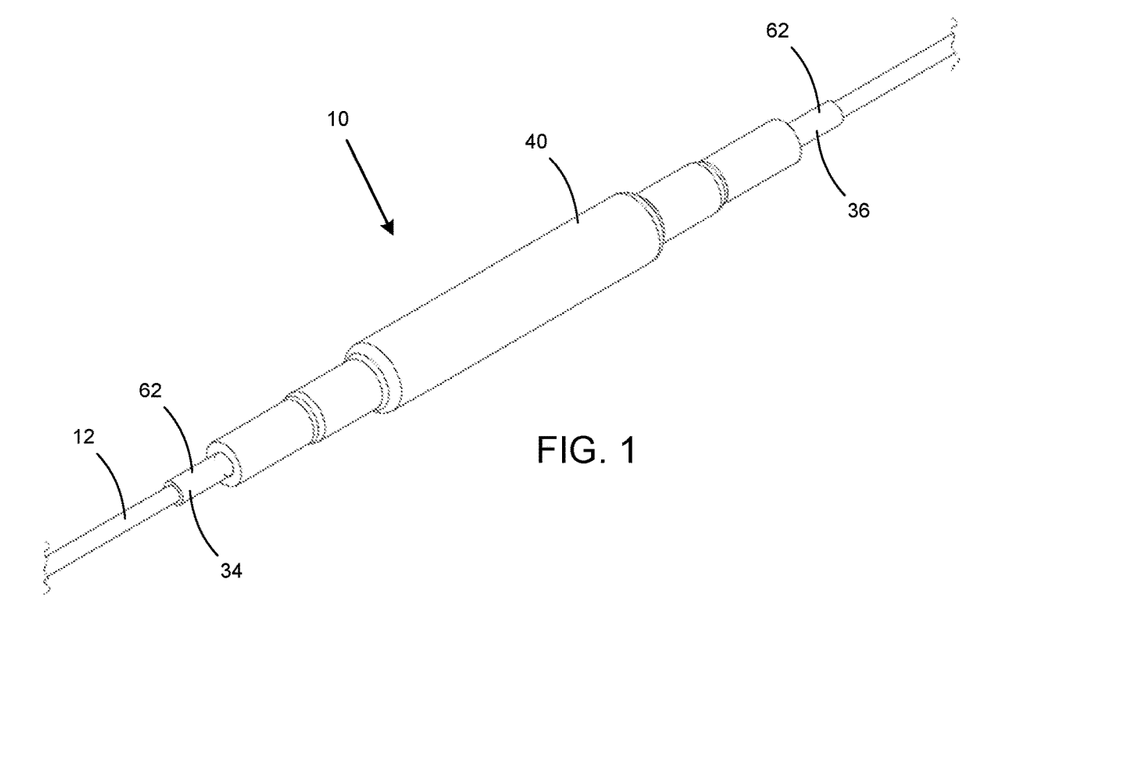
FIG. 1 is perspective view of a splice assembly used to splice a fiber optic cable.

With reference to FIG. 1, illustrated is a splice assembly 10 that has been assembled to splice a fiber optic cable 12. The splice assembly 10 may be used in different manners to splice different types of fiber optic cables that have been introduced to the market. Thus, the splice assembly 10 disclosed herein has application to several fiber optic cable types, each of which is schematically represented by the exemplary fiber optic cable 12 illustrated in FIG. 2.

Figure 2:
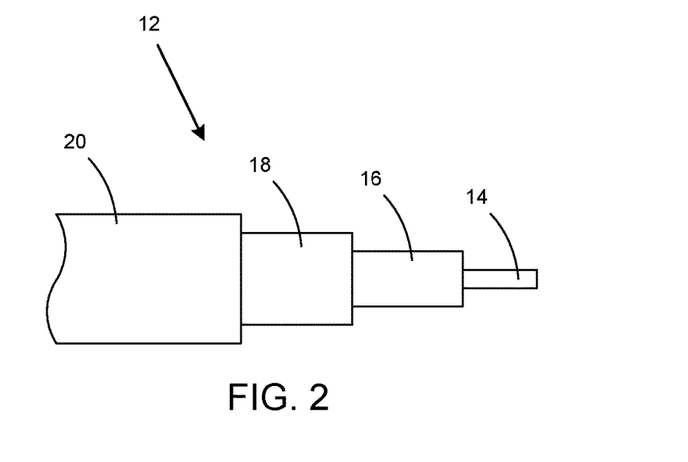
FIG. 2 is a schematic representation of the fiber optic cable.

In FIG. 2, various layers of the fiber optic cable 12 have been cut away to show underlying layers. The fiber optic cable 12 includes a fiber optic filament 14, which is sometimes referred to as a fiber. The fiber optic filament 14 allows light signals to propagate therein to carry out optical communications between optical transceivers (not shown) located at the respective ends of the fiber optic cable 12. The fiber optic filament 14 may include a core and a cladding, which are typically made of glass or plastic. In some fiber optic cables, the filament 14 may be coated with an inner coating layer (not shown in FIG. 2, but shown in FIGS. 5A and 5B at reference numeral 42). The inner coating layer 42 is usually made from acrylate. In one embodiment, the inner coating layer 42 may be made up of two or more layers.

The fiber optic filament 14 is surrounded by one or more coating layers, such as the illustrated buffer 16. In the illustrated embodiment, the buffer 16 is surrounded by strength members 18, such as aramid fibers. One or more jacketing layers, also referred to as a jacket 20, surround the strength members 18.

One type of fiber optic cable that may be spliced with the splice assembly 10 is a fiber optic cable 12 with a loose jacket and a tight buffer. In this type of cable, the cable 12 is constructed so that the jacket 20 is able to move along a longitudinal axis of the fiber optic cable 12 relative to the buffer 16. This relative movement tends to correspond to movement and bending of the cable 12 and/or to differing rates of thermal expansion or contraction among the layers of the cable 12 during exposure to hot or cold temperatures. The ability of the jacket 20 to move relative to the buffer 16 give rise to the term "loose jacket" since the jacket 20 is "loose" enough about the buffer 16 to allow for the movement. Also, in this type of cable, the buffer 16 does not move longitudinally relative to the filament 14. The inability of the buffer 16 to move relative to the filament 14 gives rise to the term "tight buffer" since the buffer 16 is "tight" about the filament 14 and imposes sufficient friction to resist movement. In the case of the loose jacket and a tight buffer fiber optic cable, the buffer 16 and filament 14 move together relative to the jacket 20.

Another type of fiber optic cable that may be spliced with the splice assembly 10 is a fiber optic cable 12 with a tight jacket and a loose buffer. In this type of cable, the cable 12 is constructed so that the jacket 20 does not move longitudinally relative to the buffer 16. The inability of the jacket 20 to move relative to the buffer 16 gives rise to the term "tight jacket" since the jacket 20 is "tight" about the buffer 16 and imposes sufficient friction to resist movement. Also, in this type of cable, the buffer 16 is able to move along the longitudinal axis of the fiber optic cable 12 relative to the filament 14. This relative movement tends to correspond to movement and bending of the cable 12 and/or to differing rates of thermal expansion or contraction among the layers of the cable 12 during exposure to hot or cold temperatures. The ability of the buffer 16 to move relative to the filament 14 give rise to the term "loose buffer" since the buffer 16 is "loose" enough about the jacket 14 to allow for the movement.

One other type of fiber optic cable that may be spliced with the splice assembly 10 is a fiber optic cable 12 with a tight jacket and a tight buffer. In this type of cable, the cable 12 is constructed with both the tight jacket and the tight buffer properties described above. As such, the jacket 20 does not move longitudinally relative to the buffer 16 and the buffer 16 does not move longitudinally relative to the filament 14.

In each of these fiber optic cable types, if the inner coating layer 42 is present, the inner coating layer 42 does not move longitudinally relative to the filament 14. The inner coating layer 42, therefore may be considered tight to the filament 14. In cases where the inner coating layer 42 is present and there is a tight buffer 16, each of the buffer 16, the inner coating layer 42 and filament 14 do not longitudinally move relative to one another. Hence, the buffer 16 may still be referred to as a tight buffer. In cases where the inner coating layer 42 is present and there is a loose buffer 16, the inner coating layer 42 and filament 14 do not longitudinally move relative to one another but the inner coating layer 42 and filament 14 move together relative to the buffer 16. Hence, the buffer 16 may still be referred to as a loose buffer.

The relative amount of friction between the layers of the fiber optic cable 12 is typically established by the manner in which the fiber optic cable 12 is manufactured, such as by coextruding layers to be either "tight" with respect to each other or "loose" with respect to each other. It will be appreciated that a tight jacket may still allow for some local movement of the buffer 16 with respect to the jacket 20 and/or a tight buffer may still allow for some local movement of the filament 14 with respect to the buffer 16. But movement over relatively long distances (e.g., about 10 centimeters or more, or about 30 centimeters or more) will tend not to occur under normal operating conditions, including harsh conditions with high amounts of shock, vibration or temperature variations, such as that found in off-road and military vehicles, airplanes, helicopters, spacecraft, etc.

Figure 3:
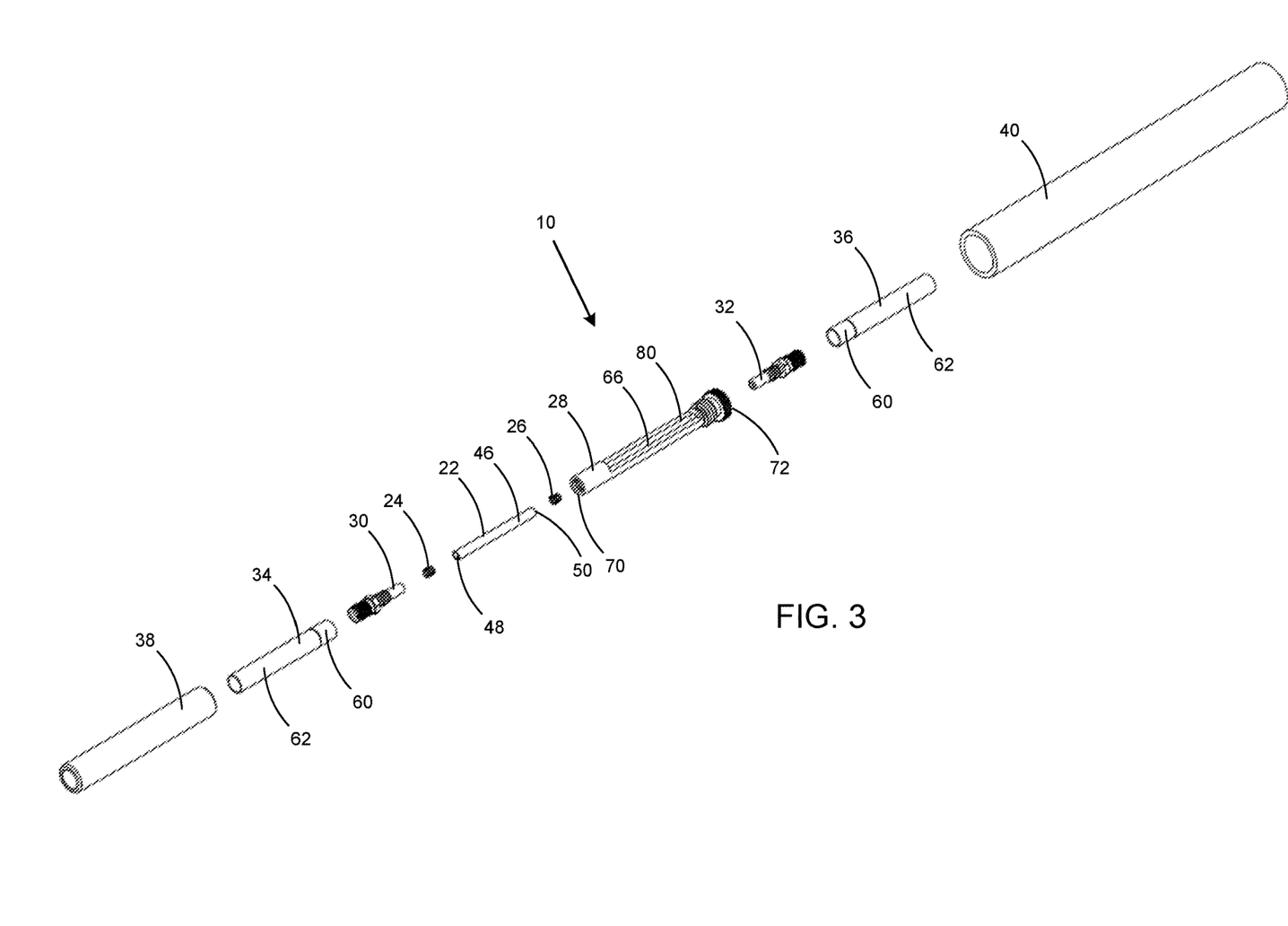
FIG. 3 is an exploded view of components of the splice assembly and without the fiber optic cable.

With additional reference to FIG. 3, the splice assembly 10 is illustrated in exploded form without the fiber optic cable 12. In the illustrated embodiment, the splice assembly 10 includes a filament alignment member 22, a first spring 24, a second spring 26, a housing 28, a first crimp die 30, a second crimp die 32, a first crimp 34, a second crimp 36, a housing cover 38, and an outer sheath 40. It will be understood, that the splice assembly 10 may have fewer components or may have additional components.

Figure 4:
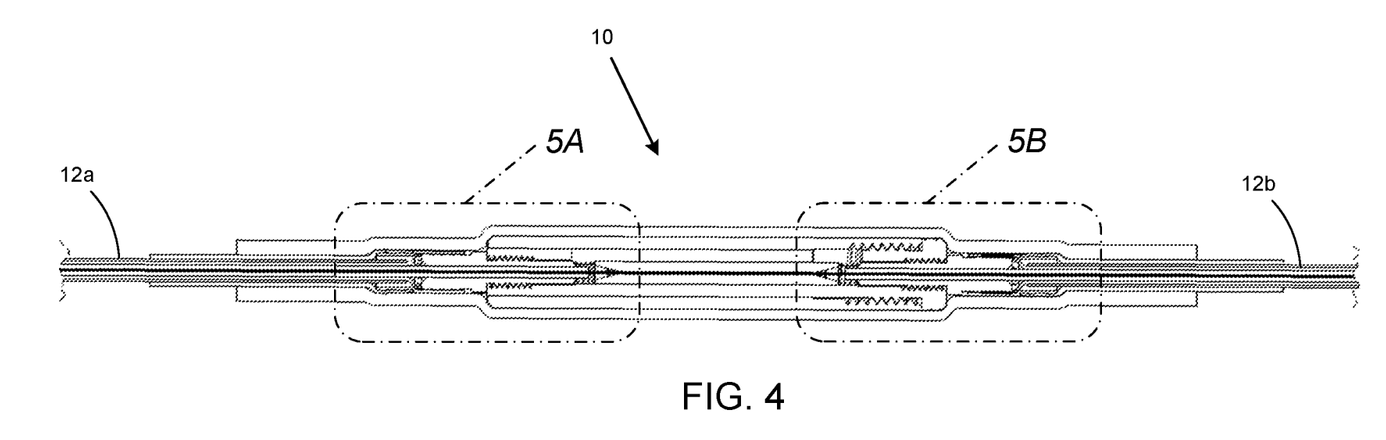
FIG. 4 is a longitudinal cross-section of the splice assembly used to splice a fiber optic cable having a tight jacket and a loose buffer.
Figure 5A:
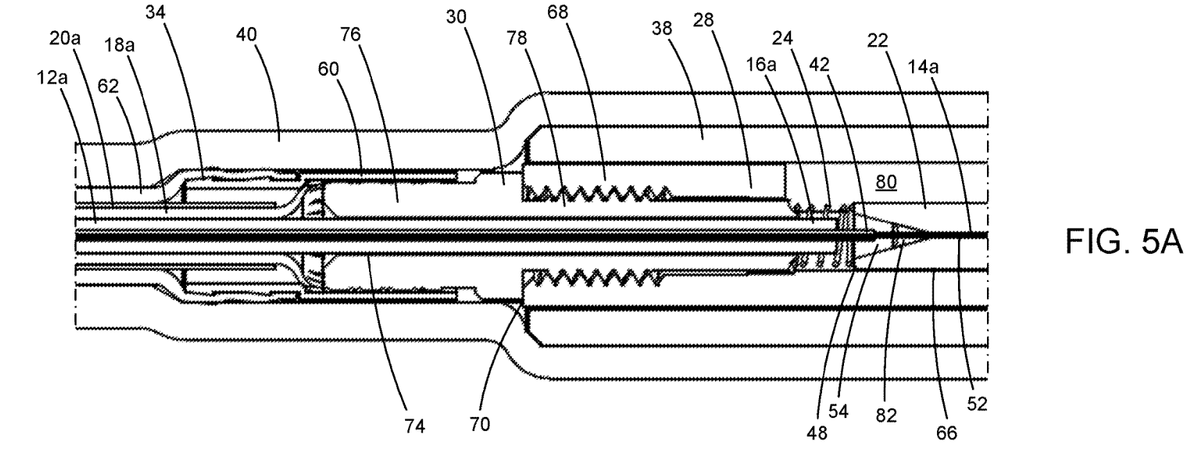
FIG. 5A is an enlarged portion of the cross-section of FIG. 4 at the area labeled 5A.
Figure 5B:
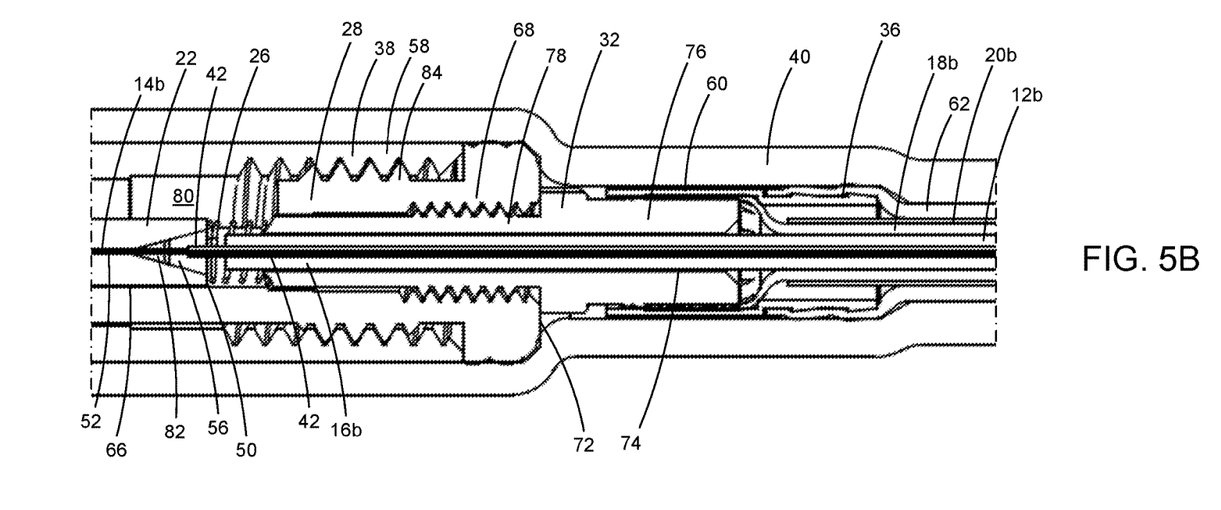
FIG. 5B is an enlarged portion of the cross-section of FIG. 4 at the area labeled 5B.

With further reference to FIGS. 4, 5A, and 5B illustrated is the splice assembly 10 used to splice a fiber optic cable 12 of the tight jacket and loose buffer type. In this configuration, the filament 14 is bonded with adhesive to a component of the splice assembly 10. For instance, the filament 14 may be bonded to the filament alignment member 22. Other parts of the fiber optic cable 12, such as the buffer 16, are not bonded to components of the splice assembly 10. Nor are parts of the splice assembly 10 bonded to each other with adhesive. This configuration allows the buffer 16 to move longitudinally relative to the filament 14 in the nominal manner of the fiber optic cable 12 as if the splice assembly 10 were not present.

In most cases, the splice assembly 10 is used to splice the fiber optic cable 12 at a point of physical failure of the cable 12, such as the location of a break in the fiber optic cable 12. As part of a splicing process, the fiber optic cable 12 may be prepared by completely cutting the fiber optic cable 12 at the point of failure, thereby creating two fiber optic cable sections 12a and 12b. For both cable sections 12a and 12b, the layers of the fiber optic cable 12 are appropriately stripped, as will become more apparent through the following description. This results in respective first and second filament sections 14a and 14b, first and second buffer sections 16a and 16b, first and second strength member sections 18a and 18b, and first and second jacket sections 20a and 20b. In the illustrated embodiment, the fiber optic cable 12 has an inner coating layer 42. Preparing the fiber optic cable 12 for splicing also may include polishing the terminal ends of the filament sections 14a and 14b.

While portions of the description are provided in terms of how the splice assembly 10 is assembled with the fiber optic cable 12, the resulting structural arrangement and intermediate structural arrangements will be understood to the skilled person.

In the illustrated embodiment, the filament alignment member 22 is a capillary tube having a cylindrical elongated body 46, a first end 48 and an opposing second end 50. An alignment passage, also referred to as an alignment channel 52, is open to the ends 48, 50 and extends the entire length of the elongated body 46. In the illustrated embodiment, the alignment channel 52 is completely surrounded by the body 46. Thus, the filament alignment member 22 forms a tube-like structure with circular outer and inner walls. An inside diameter of the inner wall forming the alignment channel 52 is the same as or slightly bigger than the filament 14. At the ends 48, 50, however, the inside diameter of the alignment channel 52 may taper radially outward to form respective cavities 54, 56 at the ends 48, 50 of the filament alignment member 22. The cavities 54, 56 may aid insertion of the ends of the filament sections 14a and 14b into the filament alignment member 22 and/or to accept a portion of the buffer sections 16a and 16b. The filament alignment member 22 is at least partially transparent to ultraviolet (UV) light or other light wavelengths used to cure adhesive in the filament alignment member 22. For this purpose, the filament alignment member 22 may be made of glass or plastic. As will be described, the filament alignment member 22 may have other arrangements.

To splice the fiber optic cable 10, the housing cover 38 and the first crimp 34 are slid onto the first cable section 12a. The housing cover 38 may be a metal or plastic tube that has internal threads 58 at one end. The first crimp 34 of the illustrated embodiment also is tubular in nature and has a crimpable portion 60 that is attached to a strain relief portion 62. The outer sheath 40, which may be a heat-shrinkable tube, and the second crimp 36 are slid onto the second cable section 12b. Similar to the first crimp 34, the second crimp 36 may be tubular in nature and has a crimpable portion 60 that is attached to a strain relief portion 62.

In one embodiment, some of the components of the splice assembly 10 are assembled before introduction of the first cable section 12a and second cable section 12b. For example, the filament alignment member 22 may be slid into a central passage 66 of the housing 28, which may be made of metal, plastic, or composite. The end portions of the central passage 66 may have threads. Thus, the housing 28 may be thought of as a tube-like member with internal threads 68 at a first end 70 and at a second end 72 of the housing 28. The first spring 24 and the second spring 26 are inserted into the central passage 66 respectively adjacent the first end 48 and second end 50 of the filament alignment member 22. Thus, the filament alignment member 22 is located between the first spring 24 and the second spring 26 in the housing 28. The first spring 24 and the second spring 26 of the illustrated embodiment are helical compression springs.

The first crimp die 30 and the second crimp die 32 are each tubular with a central bore 74. A portion of the exterior sidewall of the crimp dies 30, 32 forms a crimp land 76 for the respective crimpable portion 60 of the crimps 34, 36. Another portion of the exterior sidewall of the crimp dies 30, 32 has external threads 78 that mate with the threads 68 of the housing 28. As illustrated, the threaded portion 78 of the first crimp die 30 is threaded into the first end 70 of the housing 28 and the threaded portion 78 of the second crimp die 32 is threaded into the second end 72 of the housing 28. Thus, the springs 24, 26 and filament alignment member 22 are trapped within the central passage 66 of the housing 28 between the crimp dies 30, 32.

The first crimp die 30 may slightly load and compress the first spring 24 against the first end 48 of the filament alignment member 22 and the second crimp die 32 may slightly load and compress the second spring 26 against the second end 50 of the filament alignment member 22. Without any other securement of components of the splice assembly 10 and without any connection of the splice assembly 10 to the first or second cable sections 12a, 12b, the filament alignment member 22 may longitudinally move within the housing 28 by compression of the spring 24 or 26 that is longitudinally in the direction of movement. This will result in release of compression on the other of the springs 24 or 26.

The crimp land 76 of the first crimp die 30 protrudes longitudinally from the housing 28 in one direction and the crimp land 76 of the second crimp die 32 protrudes longitudinally from the housing 28 in the opposing direction. UV curable adhesive in liquid or gel form may be inserted into the alignment channel 52 of the filament alignment member 22. In one embodiment, the adhesive is inserted using a syringe or by using capillary action of the filament alignment member 22.

The first buffer section 16a and the first filament section 14a are slid through a central bore 74 of the first crimp die 30. In the illustrated embodiment, the first buffer section 16a extends past the end of the first crimp die 30 that is located in the housing 28 and into the first spring 24, but the first buffer section 16a does not contact the filament alignment member 22. In one embodiment, the end of the first buffer section 16a is longitudinally spaced apart from the first end 48 of the filament alignment member 22 and the inner coating layer 42 enters the cavity 54 but is spaced apart from the filament alignment member 22. In another embodiment, the first buffer section 16a ends at the end of the first crimp die 30 or in the central bore 74. The first strength member section 18a is trapped between the crimpable portion 60 of the first crimp 34 and the crimp land 76 of the first crimp die 30. The crimpable portion 60 is crimped or otherwise secured to the first crimp die 30 at the crimp land 76, thereby connecting the first cable section 12a to the splice assembly 10 by way of the trapped first strength member section 18a.

Similarly, the second buffer section 16b and the second filament section 14b are slid through a central bore 74 of the second crimp die 32. In the illustrated embodiment, the second buffer section 16b extends past the end of the second crimp die 32 that is located in the housing 28 and into the second spring 26, but the second buffer section 16b does not contact the filament alignment member 22. In one embodiment, the end of second buffer section 16b is longitudinally spaced apart from the second end 50 of the filament alignment member 22 and the inner coating layer 42 enters the cavity 56 but is spaced apart from the filament alignment member 22. In another embodiment, the second buffer section 16b ends at the end of the second crimp die 32 or in the central bore 74. The second strength member section 18b is trapped between the crimpable portion 60 of the second crimp 36 and the crimp land 76 of the second crimp die 32. The crimpable portion 60 is crimped or otherwise secured to the second crimp die 32 at the crimp land 76, thereby connecting the second cable section 12b to the splice assembly 10 by way of the trapped second strength member section 18b.

The first filament section 14a extends past the end of the first buffer section 16a and enters the alignment channel 52 of the filament alignment member 22. Similarly, the second filament section 14b extends past the end of the second buffer section 16b and enters the alignment channel 52 of the filament alignment member 22. The alignment channel 52 longitudinally and radially aligns the first filament section 14a with the second filament section 14b. The first and second filament sections 14a, 14b terminate adjacent one another (e.g., the ends of the first and second filament sections 14a, 14b contact one another) to allow for optical coupling of optical signals between the first and second filament sections 14a, 14b, thereby making an optically operative splice.

To bond the first and second filament sections 14a, 14b to one another and to bond the first and second filament sections 14a, 14b to the filament alignment member 22, the adhesive may be cured. In one embodiment, the adhesive is cured by illuminating the adhesive with UV light. For this purpose, the housing 28 has a window 80 that exposes the filament alignment member 22. In one embodiment, the window 80 also exposes the springs 24, 26. The window 80 may be, for example, a through opening in the sidewall of the housing 28 that opens to the central passage 66. The opening may be sized so that the filament alignment member 22 and the springs 24, 26 are radially trapped in the central passage 66 (e.g., an arc length of the opening at the interior sidewall of the housing 28 forming the central passage 66 is less than an outside diameter of the alignment member 22 and the springs 24, 26). As indicated, the filament alignment member 22 may be at least partially transparent to UV light. Therefore, upon exposure of the adhesive to UV light through the window 80 and filament alignment member 22, the adhesive will harden and bond the first and second filament sections 14a, 14b to the filament alignment member 22. Cured UV adhesive is shown at reference number 82. The amount of UV adhesive that is placed in the filament alignment member 22 is controlled so that the cured UV adhesive 82 does not bond to the first or second buffer sections 16a, 16b. Also, in the illustrated embodiment, the cured UV adhesive 82 partially fills the cavities 54, 56, but the inner coating layer 42 of the first and second buffer sections 16a, 16b are spaced apart from the cured UV adhesive 82. In an embodiment where the adhesive cures without exposure to light, the window 80 may be omitted.

Following curing of the adhesive, the housing cover 38 may be longitudinally slid over the housing 28 and secured in place by threading the threads 58 of the housing cover 38 onto mating exterior threads 84 of the housing 28 located at the second end 72 of the housing 28. The housing cover 38, which may be made of metal, plastic, or composite, covers the window 80 to protect the filament alignment member 22. Then, the outer sheath 40 may be slid over the housing cover 38, housing 28, and at least the crimpable portions 60 of the first and second crimps 34, 36. The outer sheath may be secured in place, such as by heat-shrinking.

The resulting splice allows the filament 14 to move relative to the buffer 16 to replicate the loose buffer configuration of the fiber optic cable 12 at the location of the splice. Additionally, the existing tight jacket configuration of the fiber optic cable 12 prevents the buffer 16 from moving relative to the jacket 20 to replicate the tight jacket configuration of the fiber optic cable 12, even at the location of the splice assembly 10. Specifically, the filament alignment member 22, and the filament 14 that is bonded thereto, may longitudinally move within the housing 28 by presence of the springs 24 or 26 located between the ends 48, 50 of the filament alignment member 22 and the ends of the crimp dies 30, 32. This allows the filament 14 to move relative to the buffer 16, and the buffer 16 is held in place relative to the jacket 20. The crimp dies 30, 32 act as stop features for the springs 24, 26 within the housing 28, thereby limiting compression of the springs 24, 26 and limiting travel of the filament alignment member 22. In another embodiment, the housing 28 may include stop features (e.g., internal shoulders) against which the springs 24, 26 are positioned. Thus, even though the splice assembly 10 is present to splice the fiber optic cable 12, the fiber optic cable 12 still behaves as a fiber optic cable of the tight jacket and loose buffer type.

Figure 6:
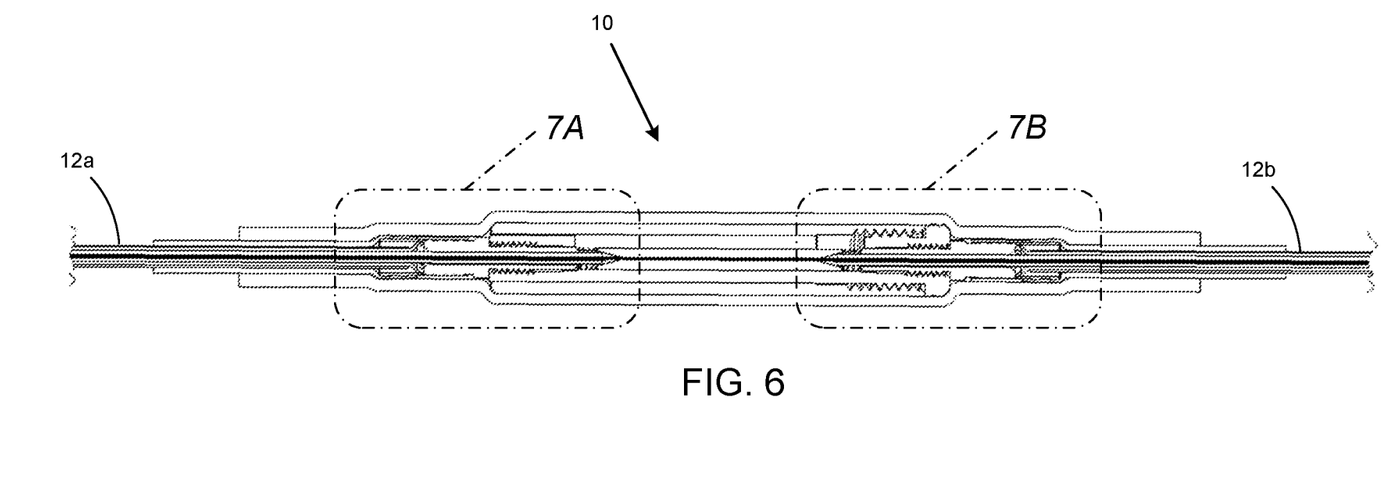
FIG. 6 is a longitudinal cross-section of the splice assembly used to splice a fiber optic cable having a loose jacket and a tight buffer.
Figure 7A:
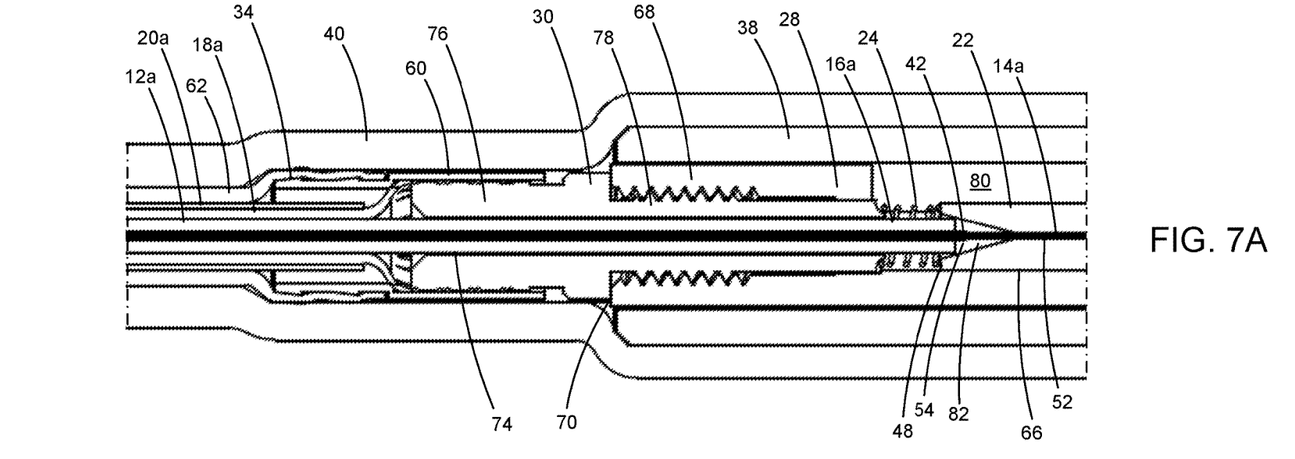
FIG. 7A is an enlarged portion of the cross-section of FIG. 6 at the area labeled 7A.
Figure 7B:
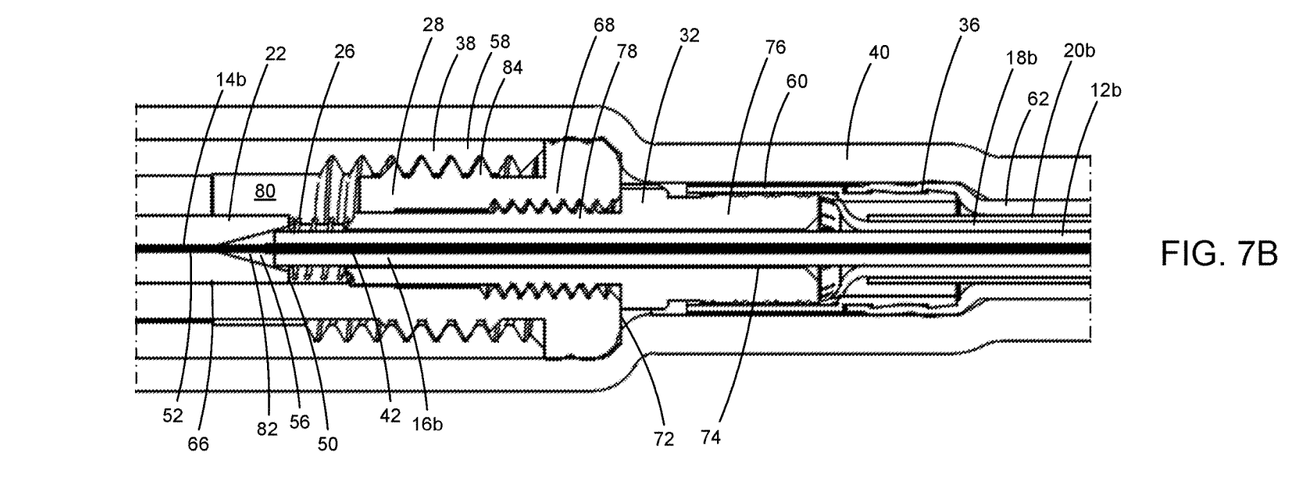
FIG. 7B is an enlarged portion of the cross-section of FIG. 6 at the area labeled 7B.

With further reference to FIGS. 6, 7A, and 7B illustrated is the splice assembly 10 used to splice a fiber optic cable 12 of the loose jacket and tight buffer type. In this configuration, the filament 14 is bonded with adhesive to a component of the splice assembly 10. For instance, the filament 14 may be bonded to the filament alignment member 22. Additionally, the buffer 16 is bonded with adhesive to a component of the splice assembly 10. For instance, the buffer 16 also may be bonded to the filament alignment member 22. Other parts of the fiber optic cable 12, such as the jacket 20, are not bonded to components of the splice assembly 10. Nor are parts of the splice assembly 10 bonded to each other with adhesive. This configuration allows the buffer 16 and filament 14 to move together relative to the jacket 20 in the nominal manner of the fiber optic cable 12 as if the splice assembly 10 were not present.

Unless otherwise noted, the splicing of the loose jacket and tight buffer type of fiber optic cable is the same as the splicing of the tight jacket and loose buffer type of fiber optic cable, which was discussed above. Therefore, for the sake of brevity, the arrangement of components and steps to achieve splicing that are the same will not be repeated. Rather, the skilled person will understand the full splicing process and resulting structure from the provided description.

The main difference between splicing of the loose jacket and tight buffer type of fiber optic cable and splicing of the tight jacket and loose buffer type of fiber optic cable is that the buffer 16 is bonded to the filament alignment member 22 for the loose jacket and tight buffer type of fiber optic cable and the buffer 16 is not bonded to the filament alignment member 22 for the tight jacket and loose buffer type of fiber optic cable.

To bond the buffer 16 to the filament alignment member 22, the buffer sections 16a and 16b may be stripped to a different length than found in the splicing of the tight jacket and loose buffer type of fiber optic cable. For example, in the illustrated embodiment, the ends of the buffer sections 16a, 16b enter the respective cavities 54, 56 of the filament alignment member 22 and contact the portion of the internal sidewall of the filament alignment member 22 that forms the cavities 54, 46. Also, a sufficient amount of adhesive is placed in the filament alignment member 22 so that, when cured, the cured adhesive 82 is bonded to the ends of the buffer sections 16a, 16b. Also, some cured adhesive 82 may be bonded to an exterior sidewall of the buffer sections 16a, 16b adjacent their ends. The cured adhesive 82 also is bonded to the alignment channel 52, cavities 54, 56 and filament sections 14a, 14b. Therefore, the cured adhesive 82 secures both the filament sections 14a, 14b and the buffer sections 16a, 16b to the filament alignment member 22. Preferably, the cured adhesive 82 is not bonded to the springs 24, 26. It is possible that some cured adhesive 82 is bonded to ends of the springs 24, 26 that are respectively adjacent the first end 48 and the second end 50 of the filament alignment member 22 (possibly bonding the springs 24, 26 to the filament alignment member 22). This is acceptable as long as the springs 24, 26 are still independently subject to their ordinary linear elastic response to compression forces.

The resulting splice bonds the filament 14, buffer 16 and filament alignment member 22 together. Since the filament alignment member 22 may move in the housing 28 and the buffer 16 is allowed to move relative to the jacket 20 due to the loose jacket configuration of the fiber optic cable 12, the splice allows the filament 14 to move together with the buffer 16 at the location of the splice to replicate the tight buffer configuration of the fiber optic cable 12. Specifically, the filament alignment member 22, and both the buffer 16 and the filament 14 that are bonded thereto, may longitudinally move within the housing 28 by presence of the springs 24 or 26 located between the ends 48, 50 of the filament alignment member 22 and the ends of the crimp dies 30, 32. The crimp dies 30, 32 act as stop features for the springs 24, 26 within the housing 28, thereby limiting compression of the springs 24, 26 and limiting travel of the filament alignment member 22. In another embodiment, the housing 28 may include stop features (e.g., internal shoulders) against which the springs 24, 26 are positioned. Thus, even though the splice assembly 10 is present to splice the fiber optic cable 12, the fiber optic cable 12 still behaves as a fiber optic cable of the loose jacket and tight buffer type.

Figure 8:
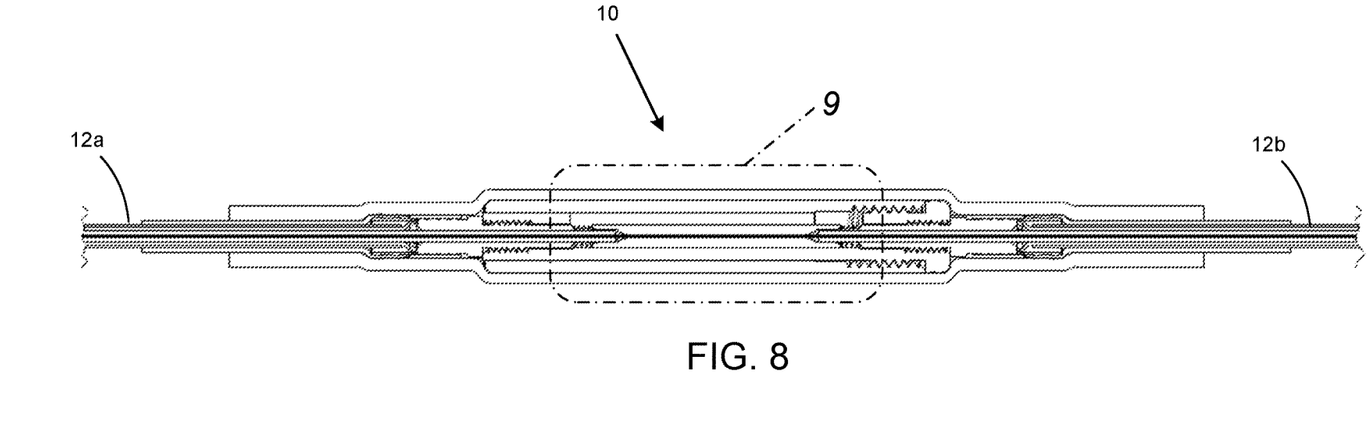
FIG. 8 is a longitudinal cross-section of another embodiment of the splice assembly used to splice a fiber optic cable having a loose jacket and a tight buffer.
Figure 9:
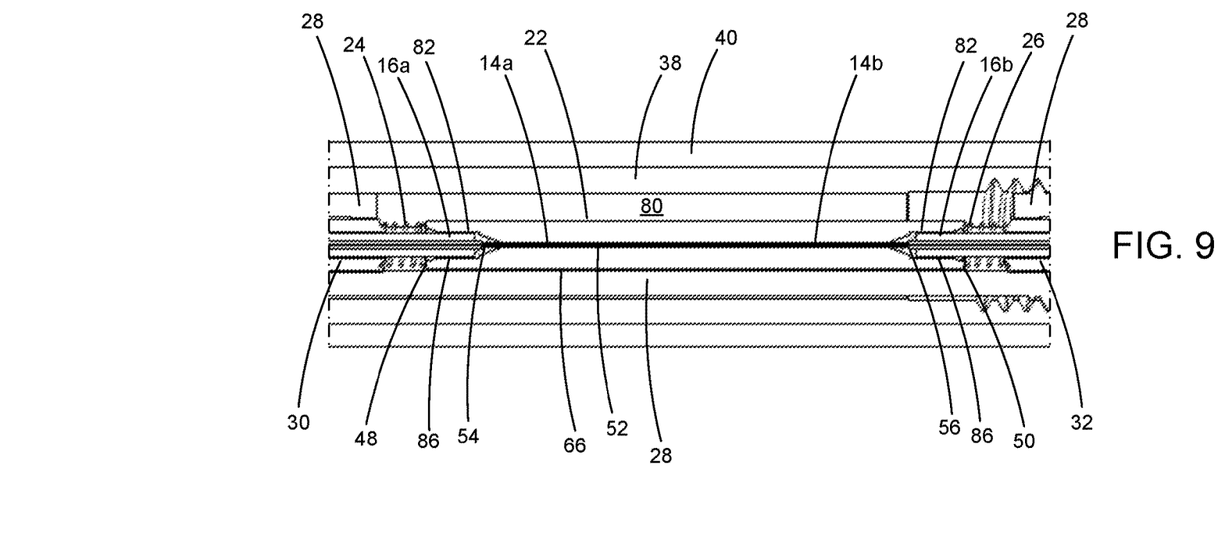
FIG. 9 is an enlarged portion of the cross-section of FIG. 8 at the area labeled 9.

With additional reference to FIGS. 8 and 9, illustrated is another embodiment of the splice assembly 10. In the illustrated embodiment, the splice assembly 10 of FIGS. 8 and 9 is used to splice a fiber optic cable 12 of the loose jacket and tight buffer type. It will be appreciated that the splice assembly 10 of FIGS. 8 and 9 may be used to splice other cable types, such as the tight jacket and loose buffer type or the tight jacket and tight buffer type.

Similar to the embodiment of FIGS. 6, 7A and 7B, in which the splice assembly 10 also splices a fiber optic cable 12 of the loose jacket and tight buffer type, the filament 14 is bonded with adhesive to a component of the splice assembly 10. For instance, the filament 14 may be bonded to the filament alignment member 22. Additionally, the buffer 16 is bonded with adhesive to a component of the splice assembly 10. For instance, the buffer 16 also may be bonded to the filament alignment member 22. But, as in the prior embodiments, other parts of the fiber optic cable 12, such as the jacket 20, are not bonded to components of the splice assembly 10. Nor are parts of the splice assembly 10 bonded to each other with adhesive. This configuration allows the buffer 16 and filament 14 to move together relative to the jacket 20 in the nominal manner of the fiber optic cable 12 as if the splice assembly 10 were not present.

Unless otherwise noted, the splice of the embodiment of FIGS. 8 and 9 is the same as the splice of the embodiment of FIGS. 6, 7A and 7B. Therefore, for the sake of brevity, the arrangement of components and steps to achieve splicing that are the same will not be repeated. Rather, the skilled person will understand the full splicing process and resulting structure from the provided description. The main difference between these two embodiments is the configuration of the filament alignment member 22. More specifically, in the embodiment of FIGS. 8 and 9, the filament alignment member 22 has been modified compared to the prior embodiments to increase the surface area of the buffer sections 16a, 16b that are bonded to the filament alignment member 22.

In the embodiment of FIGS. 8 and 9, each end of the filament alignment member 22 includes a stepped entry 86. In this embodiment, the passage in the filament alignment member 22, at the stepped entries 86, has an interior diameter along a portion of the filament alignment member 22 that is the same as or slightly larger than the exterior diameter of the buffer sections 16a, 16b. The interior diameter then reduces to the above-described interior diameter of the alignment channel 52 used to receive and radially align the filament sections 14a, 14b. The transition between the stepped entries 86 and the alignment channel 52 may be tapered to form the cavities 54 and 56.

To bond the buffer 16 to the interior of the filament alignment member 22 at the stepped entries 86, the buffer sections 16a and 16b may be stripped to a length to enter the respective stepped entries 86. Preferably, the ends of the buffer sections 16a, 16b are located near the transition from the stepped entries 86 to the alignment channel 52. Also, a sufficient amount of adhesive is placed in the filament alignment member 22 so that, when cured, the cured adhesive 82 bonds the buffer sections 16a, 16b to the interior sidewall of the filament alignment member 22 at the stepped entries 86. The cured adhesive 82 also is bonded to the alignment channel 52, cavities 54, 56 and filament sections 14a, 14b. Therefore, the cured adhesive secures both the filament sections 14a, 14b and the buffer sections 16a, 16b to the filament alignment member 22. Preferably, the cured adhesive 82 is not bonded to the springs 24, 26. It is possible that some cured adhesive 82 is bonded to ends of the springs 24, 26 that are respectively adjacent the first end 48 and the second end 50 of the filament alignment member 22 (possibly bonding the springs 24, 26 to the filament alignment member 22). This is acceptable as long as the springs 24, 26 are still independently subject to their ordinary linear elastic response to compression forces.

The resulting splice bonds the filament 14, buffer 16 and filament alignment member 22 together. Since the filament alignment member 22 may move in the housing 28 and the buffer 16 is allowed to move relative to the jacket 20 due to the loose jacket configuration of the fiber optic cable 12, the splice allows the filament 14 to move together with the buffer 16 at the location of the splice to replicate the tight buffer configuration of the fiber optic cable 12. Specifically, the filament alignment member 22, and both the buffer 16 and the filament 14 that are bonded thereto, may longitudinally move within the housing 28 by presence of the springs 24 or 26 located between the ends 48, 50 of the filament alignment member 22 and the ends of the crimp dies 30, 32. The crimp dies 30, 32 act as stop features for the springs 24, 26 within the housing 28, thereby limiting compression of the springs 24, 26 and limiting travel of the filament alignment member 22. In another embodiment, the housing 28 may include stop features (e.g., internal shoulders) against which the springs 24, 26 are positioned. Thus, even though the splice assembly 10 is present to splice the fiber optic cable 12, the fiber optic cable 12 still behaves as a fiber optic cable of the loose jacket and tight buffer type.

Figure 10:
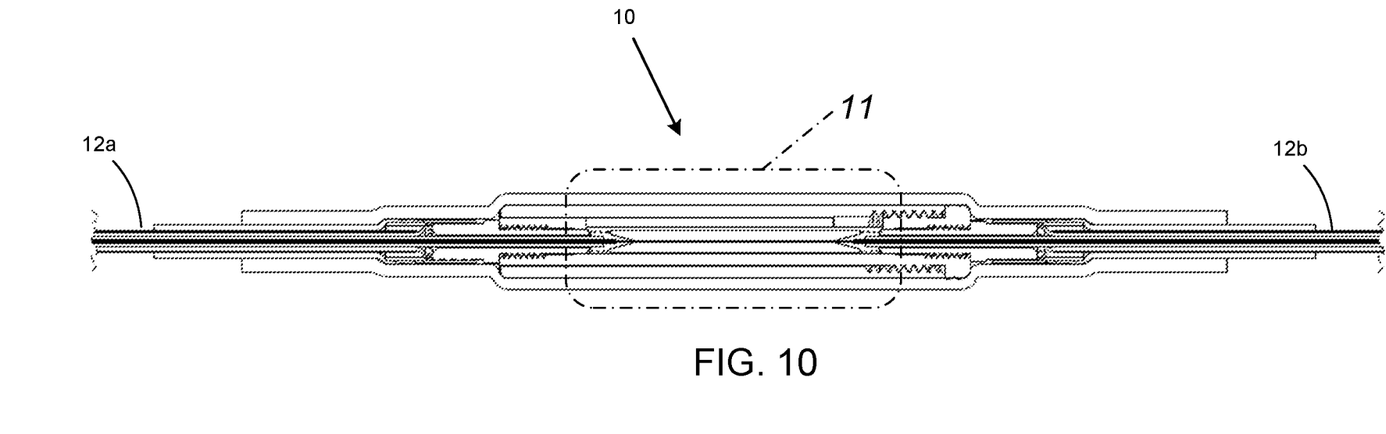
FIG. 10 is a longitudinal cross-section of the splice assembly used to splice a fiber optic cable having a tight jacket and a tight buffer.
Figure 11:
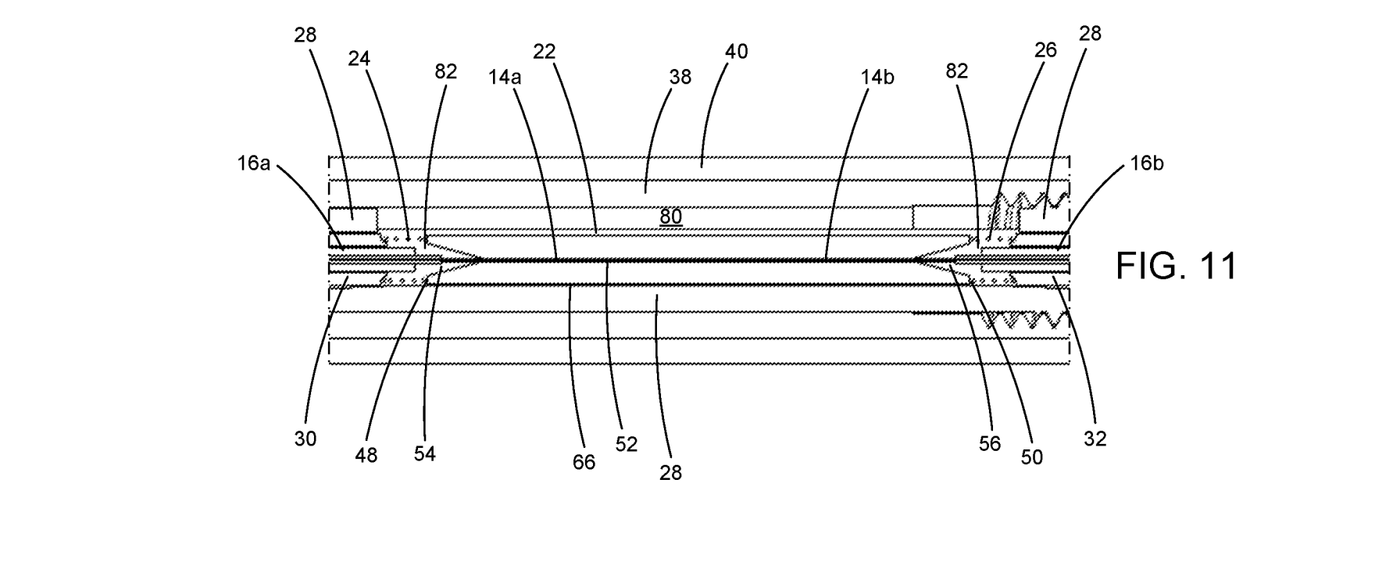
FIG. 11 is an enlarged portion of the cross-section of FIG. 10 at the area labeled 11.

With further reference to FIGS. 10 and 11, illustrated is the splice assembly 10 used to splice a fiber optic cable 12 of the tight jacket and tight buffer type. In this configuration, the filament 14 is bonded with adhesive to a component of the splice assembly 10. For instance, the filament 14 may be bonded to the filament alignment member 22. Additionally, the buffer 16 is bonded with adhesive to a component of the splice assembly 10. For instance, the buffer 16 also may be bonded to the filament alignment member 22. In addition, the springs 24, 26 are bonded with adhesive to preclude their ordinary reaction to compression and tension forces. The bonding of the springs 24, 26 prevents the filament alignment member 22 from longitudinally moving within the housing 28. The bonding of the springs 24, 26 may result in bonding of the springs 24, 26 to one or more of the filament alignment member 22, the die crimps 30, 32, the buffer sections 16a, 16b, the filament sections 14a, 14b, or the housing 28. This configuration prevents the jacket 20, buffer 16 and filament 14 from moving relative to one another to replicate the tight jacket and tight buffer of the fiber optic cable 12 even in the presence of the splice assembly 10.

Unless otherwise noted, the splicing of the tight jacket and tight buffer type of fiber optic cable is the same as the splicing of the tight jacket and loose buffer type of fiber optic cable, which was discussed above in connection with FIGS. 4, 5A and 5B. Therefore, for the sake of brevity, the arrangement components and steps to achieve splicing that are the same will not be repeated. Rather, the skilled person will understand the full splicing process and resulting structure from the provided description.

The main difference between splicing the tight jacket and tight buffer type of fiber optic cable and splicing the tight jacket and loose buffer type of fiber optic cable is that additional cured adhesive 82 is present to bond the springs 24, 26. In the illustrated embodiment, the location of the buffer sections 16a, 16b and the configuration of the filament alignment member 22 are the same as in the embodiment of FIGS. 4, 5A and 5B. In another embodiment, the location of the buffer sections 16a, 16b may be the same as in the embodiment of FIGS. 6, 7A and 7B. In another embodiment, the filament alignment member 22 may be configured as in the embodiment of FIGS. 8 and 9, in which case location of the buffer sections 16a, 16b may be the same as in the embodiment of FIGS. 8 and 9 or may be the same as one of the other embodiments.

In one embodiment the adhesive is UV curable adhesive. Since the springs 24, 26 have open spaces between adjacent coils of the springs 24, 26, the springs 24, 26 will allow the passage of light. Therefore, the UV curable adhesive may be cured by the application of UV light that is introduced through the window 80 of the housing 28. In other embodiments, the springs 24, 26 may be replaced with a mesh material that will behave in similar manner (e.g., space the housing 22 from the crimp dies 30, 32 and allow the passage of light to cure the adhesive).

The resulting splice, as well as the tight jacket and tight buffer arrangement of the fiber optic cable 12, prevents independent movement of the filament 14 relative to the buffer 16 and independent movement of the buffer 16 relative to the jacket 20 at the location of the splice. Thus, replicated at the location of the splice assembly 10 is the tight jacket and tight buffer configuration of the fiber optic cable 12.

Figure 12:
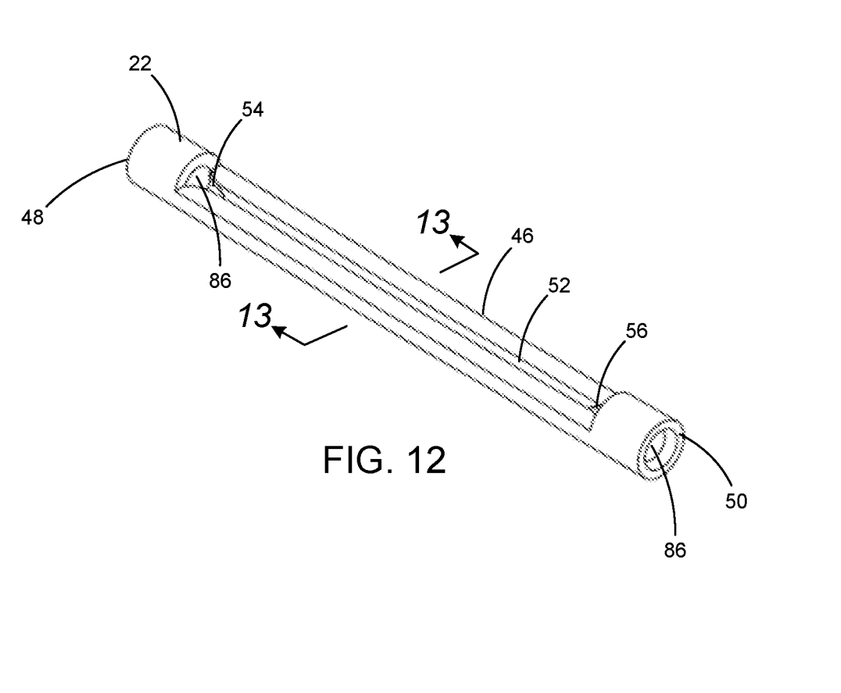
FIG. 12 is a perspective view of an embodiment of a filament alignment member of the splice assembly.
Figure 13:
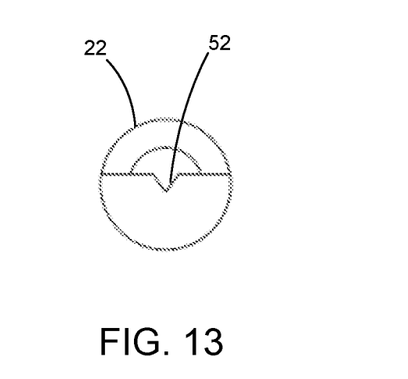
FIG. 13 is a cross-section of the filament alignment member of FIG. 12 taken at the line 13-13.

Referring to FIGS. 12 and 13, another representative embodiment of the filament alignment member 22 is illustrated. In this embodiment, the alignment channel 52 is wedge-shaped rather than circular as found in the previous embodiments. The filament sections 14a, 14b may be still be aligned by placing them in an opposing manner in the alignment channel 52. In addition, the alignment channel 52 is not completely surrounded, but is exposed along at least part of its longitudinal length. This may facilitate introduction of adhesive.

Figure 14:
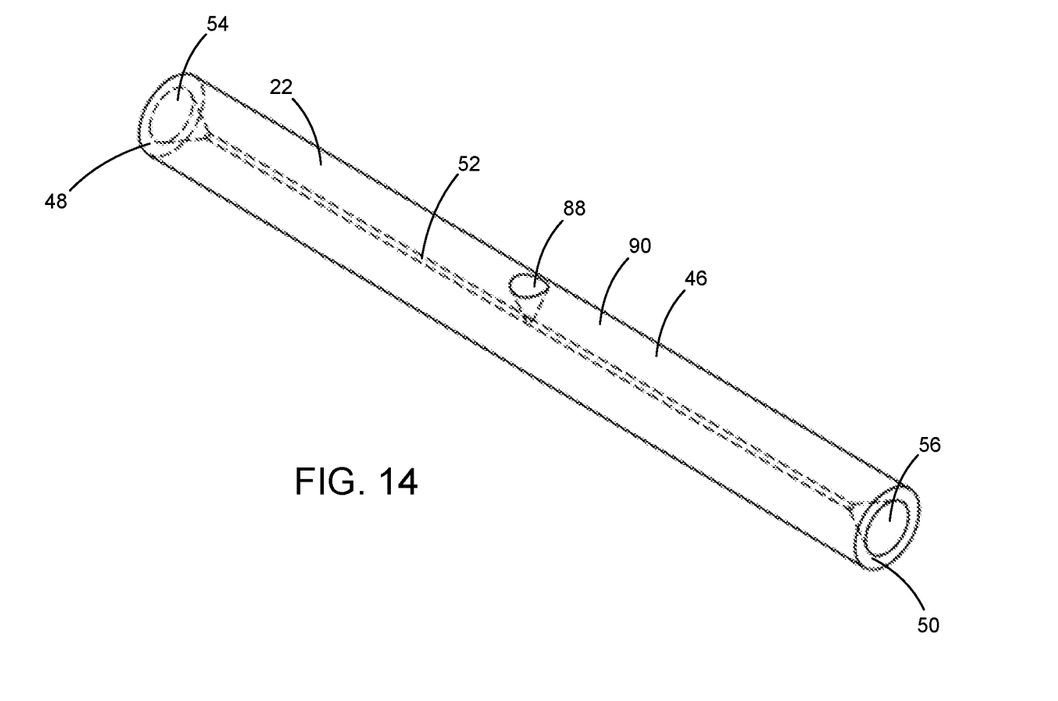
FIG. 14 is a perspective view of an embodiment of a filament alignment member of the splice assembly.
Figure 15:
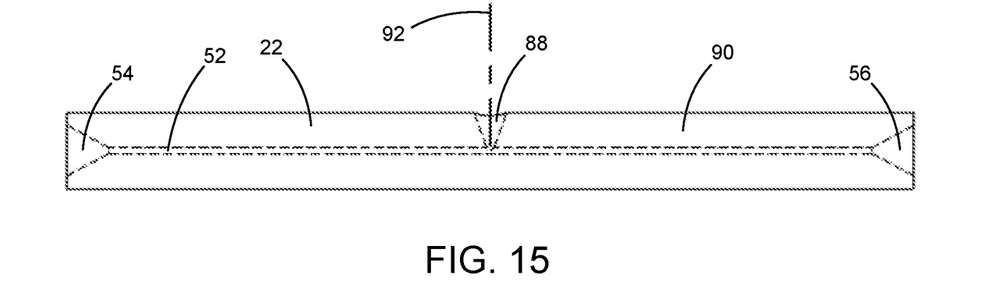
FIG. 15 is a front view of the filament alignment member of FIG. 14.
Figure 16:
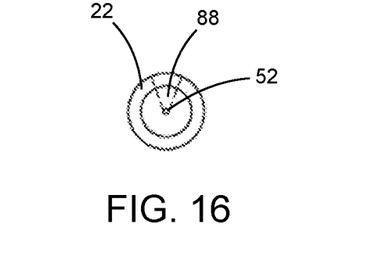
FIG. 16 is an end view of the filament alignment member of FIG. 14.

Referring to FIGS. 14, 15 and 16, another representative embodiment of the filament alignment member 22 is illustrated. In FIGS. 14, 15 and 16, internal structure is illustrated in broken line. The filament alignment member 22 of the embodiment of FIGS. 14, 15 and 16 is similar to the embodiments of FIGS. 3-11 and common or similar features will not be repeated.

The filament alignment member 22 of the embodiment of FIGS. 14, 15 and 16 includes a passage 88 (e.g., a hole) in the body 46 that extends from the alignment channel 52 to an exterior surface 90 of the filament alignment member 22. The passage 88 opens to the alignment channel 52 and the surrounding environment, thus fluidically coupling the alignment channel 52 to the surrounding environment. During insertion of the first and second filament sections 14a, 14b into the alignment channel 52, air or excess adhesive that is displaced by the first and second filament sections 14a, 14b may escape from the alignment channel 52 and into the passage 88. In some situations, this may assist in ensuring physical contact and/or optical coupling (e.g., by way of the adhesive) between the ends of the first and second filament sections 14a, 14b, resulting in an adequate splice of the fiber optic cable sections 12a, 12b.

An axis 92 (FIG. 15) of the passage 88 may be aligned radially relative to a longitudinal axis of the filament alignment member 22. In one embodiment, the passage 88 is circular about the axis 92, but other geometric shapes are possible (e.g., a rectangle, a square, an oval, etc.). In one embodiment, a diameter of the passage 88 is constant along the axis 92, making the passage cylindrical. In another embodiment, the diameter of the passage 88 is not constant along the axis 92. For instance, in the illustrated embodiment, the passage 88 is frustoconical. In the illustrated embodiment, the taper angle of the passage 88 is approximately 20 degrees, but other angles are possible. The cross-sectional area of the passage 88 at an intersection of the passage 88 with the alignment channel 52 may be approximately the cross-sectional diameter of alignment channel 52, but other sizes are possible.

The size and shape of the passage 88 define a volume of the passage 88 that may be established to accommodate a predicted amount of adhesive that is displaced from the alignment channel 52 and into the passage 88. This will reduce the possibility that adhesive cures the filament alignment member 22 to the housing 28, regardless of alignment of the window 80 with the passage 88. The size and shape of the passage 88 may be based on the adhesive type or predicted environmental conditions that may be present during splicing of the fiber optic cable sections 12a, 12b (e.g., humidity, temperature, etc.).

The intersection of the passage 88 with the alignment channel 52 may be located at a longitudinal position along the alignment channel 52 where the ends of the first and second filament sections 14a, 14b meet relative to the alignment channel 52. In many cases, the first and second fiber optic cable sections 12a, 12b are prepared for splicing in the same manner. This will nominally place the interface of the first and second filament sections 14a, 14b at the longitudinal midpoint of the alignment channel 52. Accordingly, the intersection of the passage 88 with the alignment channel 52 may be located at the longitudinal midpoint of the alignment channel 52. In other embodiments, the intersection of the passage 88 with the alignment channel 52 may be in other locations and/or there may be more than one passage 88.

Additional aspects of the disclosure will be understood from the appended claims, which form part of this specification.

The invention claimed is:

1. A splice assembly for a fiber optic cable having first and second fiber optic cable sections, comprising:
   a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member;

a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and a first crimp die that includes the first stop feature and a first land against which strength members of the first fiber optic cable section are securable and a second crimp die that includes the second stop feature and a second land against which strength member of the second fiber optic cable section are securable; and wherein the filament alignment member is longitudinally moveable relative to the housing by compression of one of the springs in a direction of travel of the filament alignment member against the corresponding stop feature.

2. The splice assembly of claim 1, wherein the first and second stop features form part of the housing or are attached to the housing.

3. The splice assembly of claim 1, wherein the first crimp die is attached to the housing by threads of the crimp die that mate with threads in the passage of the housing and the second crimp die is attached to the housing by threads of the crimp die that mate with threads in the passage of the housing.

4. The splice assembly of claim 1, further comprising a first crimp configured to trap the strength members of the first fiber optic cable section between the first crimp and the first land and a second crimp configured to trap the strength members of the second fiber optic cable section between the second crimp and the second first land.

5. A splice assembly for a fiber optic cable having first and second fiber optic cable sections, comprising:

a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member; and a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and wherein the filament alignment member is longitudinally moveable relative to the housing by compression of one of the springs in a direction of travel of the filament alignment member against the corresponding stop feature;

wherein the housing includes a longitudinal window that exposes the filament alignment member to light directed toward the window; and wherein the window further exposes the first and second springs to the light.

6. The splice assembly of claim 5, further comprising a housing cover that attaches to the housing to cover the window.

7. The splice assembly of claim 5, further comprising curable adhesive at least in the filament alignment member, the curable adhesive curing in the presence of the light.

8. The splice assembly of claim 7, wherein the light is UV light and the curable adhesive is UV curable adhesive.

9. A splice assembly for a fiber optic cable having first and second fiber optic cable sections, comprising:

a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member;

a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and adhesive in an amount configured to secure the filament sections to the filament alignment member and, following assembly of the splice assembly with the fiber optic cable, the splice assembly replicating a tight jacket and loose buffer configuration of the fiber optic cable at a location of a splice between the first filament section and the second filament section; and wherein the filament alignment member is longitudinally moveable relative to the housing by compression of one of the springs in a direction of travel of the filament alignment member against the corresponding stop feature.

10. The splice assembly of claim 9, wherein the adhesive does not secure a first buffer section of the first fiber optic cable section to the filament alignment member, does not secure a second buffer section of the second fiber optic cable section to the filament alignment member, and does not prevent compression of the first and second springs to defeat the longitudinal movement of the filament alignment member in the housing.

11. A splice assembly for a fiber optic cable having first and second fiber optic cable sections, comprising:

a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member;

a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and adhesive in an amount configured to secure the filament sections to the filament alignment member, secure a first buffer section of the first fiber optic cable section to the filament alignment member, and secure a second buffer section of the second fiber optic cable section to the filament alignment member and, following assembly of the splice assembly with the fiber optic cable, the splice assembly replicating a loose jacket and tight buffer configuration of the fiber optic cable at a location of a splice between the first filament section and the second filament section; and wherein the filament alignment member is longitudinally moveable relative to the housing by compression of one of the springs in a direction of travel of the filament alignment member against the corresponding stop feature.

12. The splice assembly of claim 11, wherein the adhesive does not prevent compression of the first and second springs to defeat the longitudinal movement of the filament alignment member in the housing.

13. A splice assembly for a fiber optic cable having first and second fiber optic cable sections, comprising:

a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member;

a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and adhesive in an amount configured to secure the filament sections to the filament alignment member, secure a first buffer section of the first fiber optic cable section to the filament alignment member, secure a second buffer section of the second fiber optic cable section to the filament alignment member, and prevent compression of the first and second springs to defeat the longitudinal movement of the filament alignment member in the housing, and, following assembly of the splice assembly with the fiber optic cable, the splice assembly replicating a tight jacket and tight buffer configuration of the fiber optic cable at a location of a splice between the first filament section and the second filament section; and wherein the filament alignment member is longitudinally moveable relative to the housing by compression of one of the springs in a direction of travel of the filament alignment member against the corresponding stop feature.

14. A splice assembly for a fiber optic cable having first and second fiber optic cable sections, comprising:

a filament alignment member comprised of an elongated body having a first end and a second end, and an alignment channel extending between the first end and the second end, the alignment channel configured to align an end portion of a first filament section of the first fiber optic cable section with an opposed end portion of a second filament section of the second fiber optic cable section;

a first spring positioned adjacent the first end of the filament alignment member;

a second spring positioned adjacent the second end of the filament alignment member; and a housing having a passage in which the first spring, filament alignment member and second spring are longitudinally positioned, the first spring located between the first end of the filament alignment member and a first stop feature arranged at the housing, and the second spring located between the second end of the filament alignment member and a second stop feature arranged at the housing; and wherein the filament alignment member is longitudinally moveable relative to the housing by compression of one of the springs in a direction of travel of the filament alignment member against the corresponding stop feature; and wherein the filament alignment member further comprises a radial passage, the radial passage fluidly coupled to the alignment channel to allow at least one of air or adhesive that is displaced by at least one of the first filament section or the second filament section to escape from the alignment channel into the passage.

15. The splice assembly of claim 14, wherein the radial passage is circular about an axis of the radial passage.

16. The splice assembly of claim 15, wherein the radial passage is frustoconical.

17. The splice assembly of claim 14, wherein an intersection of the radial passage and the alignment channel is at a longitudinal midpoint of the filament alignment member.

* * * * *